United States Patent
Michaelis et al.

(10) Patent No.: US 8,886,721 B2
(45) Date of Patent: Nov. 11, 2014

(54) SHORT IMPROMPTU COMMUNICATIONS IN PRESENCE-BASED SYSTEMS

(75) Inventors: Paul Roller Michaelis, Louisville, CO (US); David S. Mohler, Arvada, CO (US)

(73) Assignee: Avaya Inc., Basking Ridge, NJ (US)

(*) Notice: Subject to any disclaimer, the term of this patent is extended or adjusted under 35 U.S.C. 154(b) by 1136 days.

(21) Appl. No.: 12/423,518

(22) Filed: Apr. 14, 2009

(65) Prior Publication Data

US 2010/0260326 A1 Oct. 14, 2010

(51) Int. Cl.
*G06F 15/16* (2006.01)
*H04L 29/08* (2006.01)
*G06Q 10/10* (2012.01)
*H04M 3/436* (2006.01)
*H04M 3/42* (2006.01)

(52) U.S. Cl.
CPC ........... *H04M 3/436* (2013.01); *H04L 67/14* (2013.01); *H04M 3/42374* (2013.01); *G06Q 10/10* (2013.01); *H04L 67/24* (2013.01); *H04M 2203/2072* (2013.01); *H04M 2203/2038* (2013.01); *H04L 67/22* (2013.01)
USPC .. 709/204; 709/203; 379/201.01; 379/202.01

(58) Field of Classification Search
CPC .......... H04L 67/24; H04L 67/22; H04L 67/14
USPC ................. 709/203, 204; 379/201.01, 202.01
See application file for complete search history.

(56) References Cited

U.S. PATENT DOCUMENTS

| | | | | |
|---|---|---|---|---|
| 5,386,112 A | * | 1/1995 | Dixon | 250/234 |
| 5,451,766 A | * | 9/1995 | Van Berkel | 250/208.1 |
| 6,820,811 B1 | * | 11/2004 | Detwiler | 235/462.37 |
| 7,095,835 B2 | * | 8/2006 | Brown et al. | 379/188 |
| 7,149,810 B1 | * | 12/2006 | Miller et al. | 709/246 |
| 7,318,040 B2 | * | 1/2008 | Doss et al. | 705/7.16 |
| 7,383,291 B2 | * | 6/2008 | Guiheneuf et al. | 715/751 |
| 7,475,021 B2 | * | 1/2009 | Wilbrink et al. | 705/7.19 |

(Continued)

FOREIGN PATENT DOCUMENTS

| | | |
|---|---|---|
| EP | 1720124 A1 | 11/2006 |
| KR | 2007-0029642 | 3/2007 |

OTHER PUBLICATIONS

Wheeler, Owen, "GB Application No. GB0916733.9 Search Report Jan. 15, 2010", , Publisher: UK IPO, Published in: GB.

(Continued)

*Primary Examiner* — Jimmy H Tran
(74) *Attorney, Agent, or Firm* — Sheridan Ross P.C.

(57) ABSTRACT

An apparatus and methods are disclosed for enabling certain types of communications to occur, even when presence information might indicate that a particular user is unavailable. In the illustrative embodiment, a first user submits a request to communicate with a second user, where the request specifies a maximum time duration for the communication, and optionally: a minimum time duration, an expected time duration, a priority, a subject, and a type of communication. A presence server receives the request and decides whether the request should be granted based on the information specified in the request, and one or both of: presence information for the second user, and the contents of a calendar. The illustrative embodiment is also capable of detecting inconsistencies between calendars and presence information, as well as events that might affect a user's presence or indicate a departure from scheduled activities.

20 Claims, 3 Drawing Sheets

(56) References Cited

U.S. PATENT DOCUMENTS

| | | | |
|---|---|---|---|
| 7,487,234 B2* | 2/2009 | Doss et al. | 709/223 |
| 7,519,663 B1* | 4/2009 | Bostick et al. | 709/204 |
| 7,584,114 B2* | 9/2009 | Estrada et al. | 705/7.23 |
| 7,680,480 B2* | 3/2010 | John et al. | 455/405 |
| 7,840,543 B2* | 11/2010 | Guiheneuf et al. | 707/695 |
| 7,899,161 B2* | 3/2011 | Katkam et al. | 379/88.13 |
| 8,090,821 B2* | 1/2012 | Holt et al. | 709/224 |
| 8,146,104 B2* | 3/2012 | Chakra et al. | 719/318 |
| 8,171,104 B2* | 5/2012 | Qi | 709/217 |
| 8,244,568 B2* | 8/2012 | Baron et al. | 705/7.18 |
| 8,375,081 B2* | 2/2013 | Feliberti et al. | 709/203 |
| 8,392,365 B2* | 3/2013 | Feliberti et al. | 707/614 |
| 8,407,076 B2* | 3/2013 | Nastacio | 705/7.19 |
| 8,443,115 B2* | 5/2013 | Kotzin | 710/15 |
| 8,473,559 B2* | 6/2013 | Das et al. | 709/206 |
| 8,494,890 B2* | 7/2013 | Doss et al. | 705/7.18 |
| 8,554,476 B2* | 10/2013 | Coughlin et al. | 701/465 |
| 8,612,535 B2* | 12/2013 | da Fonseca Mendes et al. | 709/207 |
| 2002/0069249 A1* | 6/2002 | Pedersen | 709/204 |
| 2002/0097856 A1 | 7/2002 | Wullert, II | |
| 2002/0194246 A1* | 12/2002 | Moskowitz et al. | 709/102 |
| 2003/0110228 A1* | 6/2003 | Xu et al. | 709/207 |
| 2003/0157962 A1* | 8/2003 | Tourrilhes | 455/557 |
| 2003/0161456 A1* | 8/2003 | Brown et al. | 379/188 |
| 2004/0054726 A1* | 3/2004 | Doss et al. | 709/205 |
| 2004/0064567 A1* | 4/2004 | Doss et al. | 709/228 |
| 2004/0064585 A1* | 4/2004 | Doss et al. | 709/246 |
| 2004/0143472 A1* | 7/2004 | Estrada et al. | 705/8 |
| 2005/0144333 A1* | 6/2005 | Kotzin | 710/15 |
| 2006/0253593 A1* | 11/2006 | Jachner | 709/227 |
| 2007/0143399 A1* | 6/2007 | Qi | 709/204 |
| 2007/0266096 A1* | 11/2007 | Daly et al. | 709/204 |
| 2008/0019285 A1* | 1/2008 | John et al. | 370/254 |
| 2008/0021949 A1* | 1/2008 | John et al. | 709/200 |
| 2008/0057894 A1* | 3/2008 | Aleksic et al. | 455/187.1 |
| 2008/0133302 A1* | 6/2008 | Brauninger et al. | 705/8 |
| 2008/0162237 A1* | 7/2008 | Hurmola et al. | 705/8 |
| 2008/0244026 A1* | 10/2008 | Holt et al. | 709/206 |
| 2009/0067603 A1* | 3/2009 | Mohler | 379/202.01 |
| 2009/0094623 A1* | 4/2009 | Chakra et al. | 719/329 |
| 2011/0093548 A1* | 4/2011 | Das et al. | 709/206 |
| 2014/0114571 A1* | 4/2014 | Coughlin et al. | 701/526 |

OTHER PUBLICATIONS

Official Action with English translation for German Patent Application No. 102009043292.2, dated May 4, 2012 10 pages.

Official Action with English Translation for Korea Patent Application No. 10-2009-0093073, dated Nov. 29, 2013 7 pages.

* cited by examiner

SHORT IMPROMPTU COMMUNICATIONS IN PRESENCE-BASED SYSTEMS

FIELD OF THE INVENTION

The present invention relates to telecommunications in general, and, more particularly, to presence-based communications systems.

BACKGROUND OF THE INVENTION

In telecommunications networks, presence information (or presence state) conveys the ability and willingness of a potential communication partner (e.g., a user, etc.) to communicate. Presence information for a user is typically provided to a presence service by a user client that resides and executes on a telecommunications terminal (e.g., a cell phone, a notebook computer, a "netbook" computer, a smartphone, etc.). The presence service typically stores this information in a personal availability record called a presentity that can be made available for distribution to other users (called watchers).

Presence information has wide application in many communication and computing services and is one of the innovations driving the popularity of instant messaging (IM) and Voice over Internet Protocol (VoIP) telephony. Some telecommunications systems employ presence information across a plurality of telecommunications channels and terminals, creating an aggregated view of user presence known as Multiple Points of Presence (MPOP).

In some situations presence information might be automatically inferred from passive observation of a user's actions. For example, a user who is engaged in an instant messaging (IM) session and is inactive for a given time interval might be inferred to be "away" or "unavailable". Similarly, presence information might be inferred in other ways, such as, for example, based on: whether a user's telecommunications terminal is powered on or off; whether a user is logged into his or her computer; the contents of a calendar (or schedule) for one or more users; and so forth.

SUMMARY OF THE INVENTION

The present invention enables certain types of communications to occur even when presence information might indicate that a particular user is not available to communicate. In particular, in accordance with the illustrative embodiment, a first user submits a request to communicate with a second user, where the request specifies a maximum time duration for the communication, and optionally, one or more of the following:
  a minimum time duration,
  an expected time duration,
  a priority,
  a subject, and
  a type of communication (e.g., voice call, email, short message service [SMS] message, etc.).

A presence server receives the request, and then decides whether the request should be granted based on the information specified in the request, and one or both of:
  presence information for the second user, and
  the contents of a calendar.

For example, in accordance with the illustrative embodiment, if a first user indicates that a particular communication will take a maximum of twenty seconds, has a high priority, and will occur as an instant messaging (IM) session, then a presence server might determine that the request should be granted even if the second user is technically considered unavailable because:
  the second user is currently engaged in a voice telephone call, or
  a calendar indicates that the second user is at a meeting.

The present invention thus enables short, "impromptu" communications when it is determined that such communications will not be overly disruptive.

The illustrative embodiment of the present invention is also capable of detecting and exploiting inconsistencies between a calendar and presence information. For example, in accordance with the illustrative embodiment, if a calendar indicates that a user is participating in a conference call, but presence information indicates that the user is not actually on the conference call (e.g., the conference call might be starting a few minutes late, etc.), then a request to communicate with that user for a maximum of thirty seconds might be granted (the reasoning being that the communication will likely be finished before the late-starting conference call commences).

Moreover, the illustrative embodiment is capable of detecting the initiation and completion of activities that might affect a user's presence, or might indicate a departure from a user's calendar (e.g., launching or terminating an application that executes on the user's telecommunications terminal, initiating or terminating a communications session, opening or closing a file, etc.). Such events are considered in addition to maximum duration and any other optionally-specified information when determining whether to grant communication requests.

The illustrative embodiment comprises: receiving a request by a first user to communicate with a second user, wherein the request specifies a maximum time duration; and determining whether to grant the request based on the maximum time duration and on presence information for the second user.

DETAILED DESCRIPTION

Figure 1:
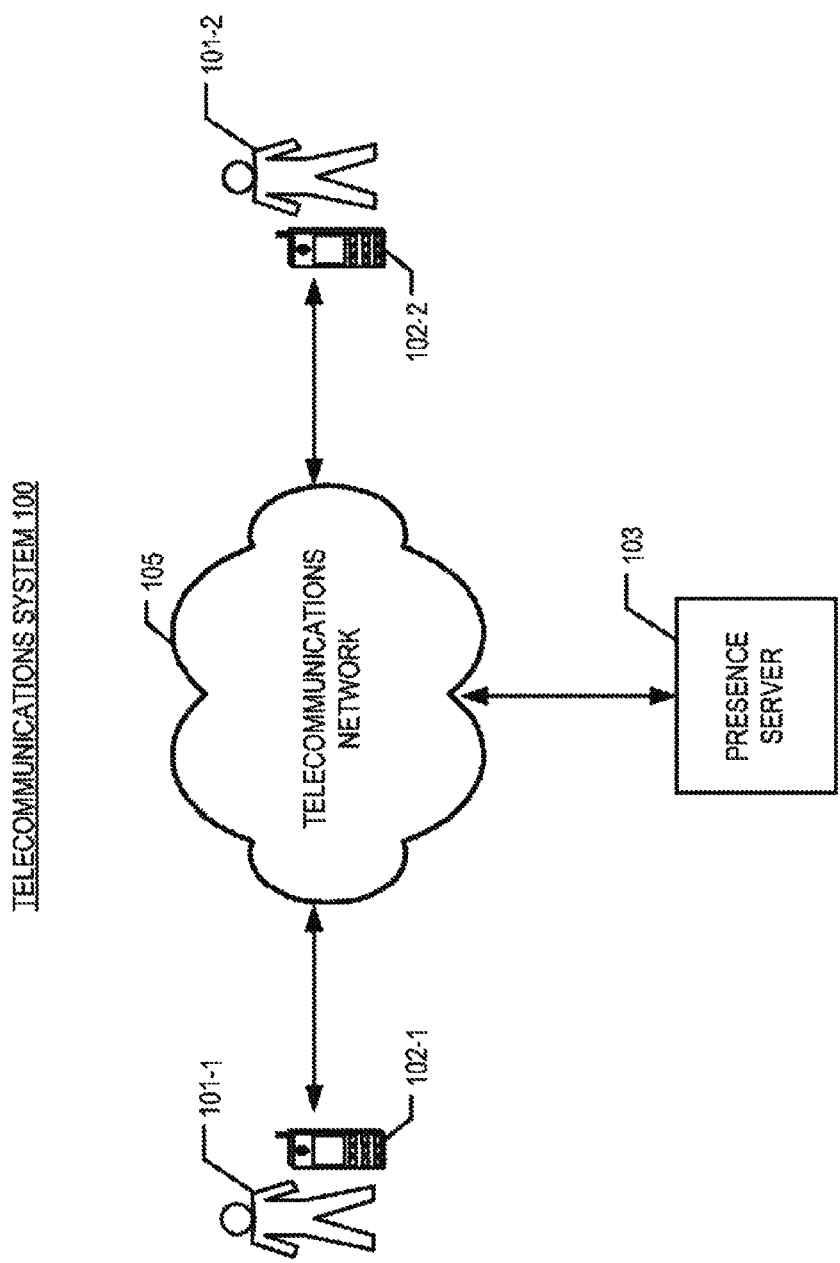
FIG. 1 depicts the salient elements of a telecommunications system, in accordance with the illustrative embodiment of the present invention.

FIG. 1 depicts the salient elements of telecommunications system 100, in accordance with the illustrative embodiment of the present invention. As shown in FIG. 1, telecommunications system 100 comprises telecommunications terminals 102-1 and 102-2, presence server 103, and telecommunications network 105, interconnected as shown.

Telecommunications terminal 102-1 is a cell phone, a wireline phone, a smartphone, a notebook computer, etc. that is used by user 101-1. Telecommunications terminal 102-1 is capable of communicating via telecommunications network 105 (e.g., the Public Switched Telephone Network [PSTN], the Internet, a private wide-area network, some combination of such networks, etc.) with telecommunications terminal 102-2 and presence server 103, and of transmitting presence information to presence server 103 via telecommunications network 105, in well-known fashion.

Similarly, telecommunications terminal 102-2 is used by user 101-2 and is capable of communicating via telecommunications network 105 with telecommunications terminal 102-1 and presence server 103, and of transmitting presence information to presence server 103 via telecommunications network 105, in well-known fashion. As will be appreciated by those skilled in the art, in some embodiments of the present invention telecommunications terminal 102-2 might also be capable of executing one or more software applications (e.g., a calendar application for storing a schedule for user 101-2, a spreadsheet application, a game, etc.), while in some other embodiments of the present invention, telecommunications terminal 102-2 might not be capable of such functionality (e.g., if telecommunications terminal 102-2 is a basic wireline telephone, if terminal 102-1 does not have any such applications resident on the device, etc.). In any case, it will be clear to those skilled in the art, after reading this disclosure, how to implement the methods described below and with respect to FIGS. 2 and 3.

Figure 2:
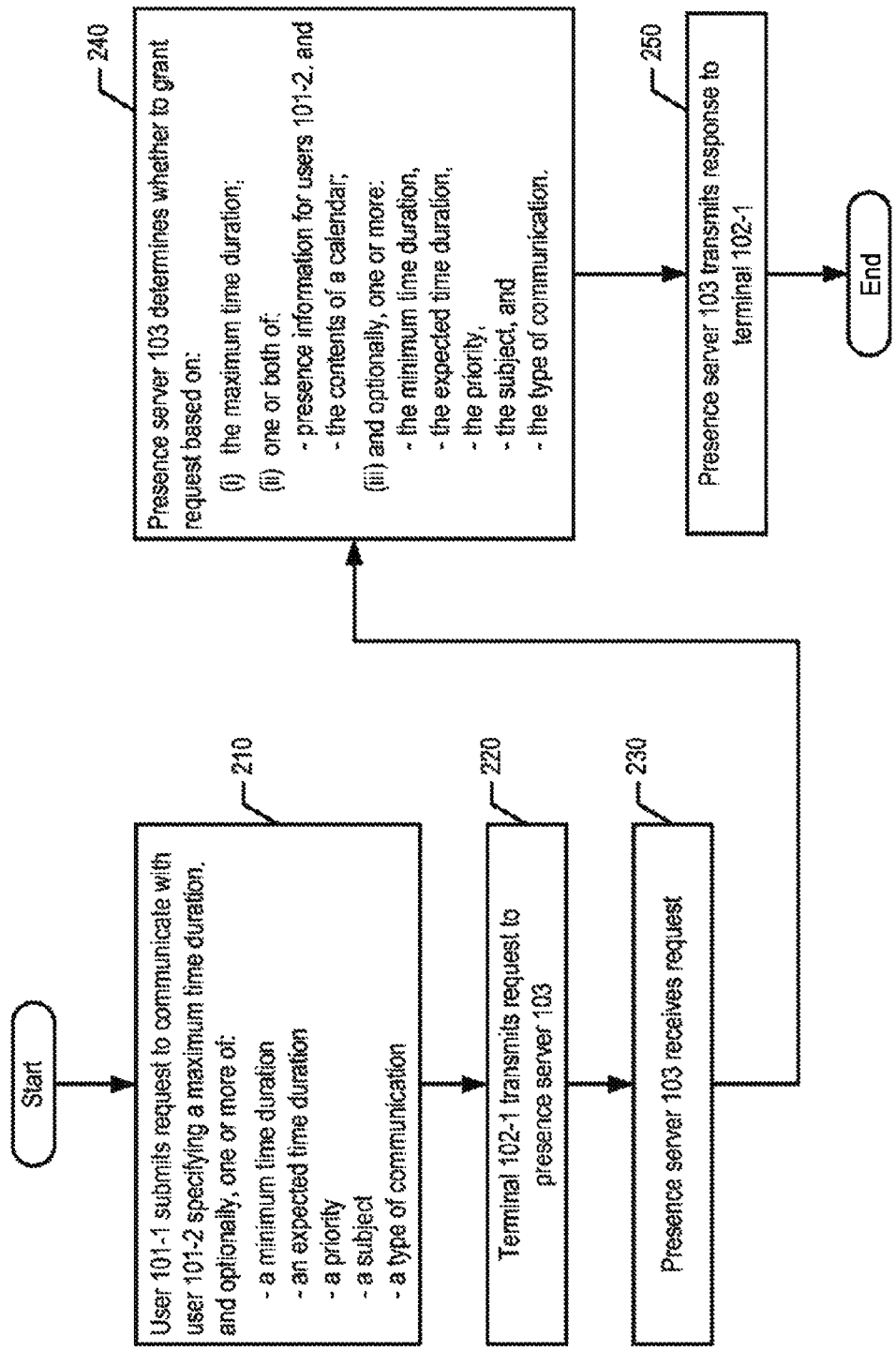
FIG. 2 depicts a flowchart of a first method for allowing or refusing communication requests, in accordance with the illustrative embodiment of the present invention.

Presence server 103 is a data-processing system that is capable of receiving presence information from telecommunications terminals 102-1 and 102-2 via telecommunications network 105, of receiving communication requests from telecommunications terminals 102-1 and 102-2 via telecommunications network 105, of transmitting responses to such communication requests to telecommunications terminals 102-1 and 102-2 via telecommunications network 105, and of executing the salient tasks described below and with respect to FIG. 2.

As will be appreciated by those skilled in the art, in some embodiments of the present invention, including the illustrative embodiment, telecommunications system 100 might comprise other elements not depicted in FIG. 2 (e.g., a Session Initiation Protocol [SIP] server, a router, a switch, etc.), and it will be clear to those skilled in the art, after reading this disclosure, how to make and use embodiments of the present invention comprising such elements.

FIG. 2 depicts a flowchart of a first method for allowing or refusing communication requests, in accordance with the illustrative embodiment of the present invention. It will be clear to those skilled in the art, after reading this disclosure, which tasks depicted in FIG. 2 can be performed simultaneously or in a different order than that depicted.

At task 210, user 101-1 submits a request via telecommunications terminal 102-1 to communicate with user 101-2, where the request specifies a maximum time duration, and optionally, one or more of:
 a minimum time duration,
 an expected time duration,
 a priority,
 a subject, and
 a type of communication (e.g., voice call, email, short message service [SMS] message, etc.).

At task 220, telecommunications terminal 102-1 transmits the request to presence server 103 via telecommunications network 105, in well-known fashion.

At task 230, the request is received by presence server 103, in well-known fashion.

At task 240, presence server 103 determines whether to grant the communication request based on:
 the maximum time duration;
 one or both of:
  presence information for user 101-2, and
  the contents of a calendar;
 and optionally, one or more of:
  the minimum time duration,
  the expected time duration,
  the priority,
  the subject, and
  the type of communication.

As will be appreciated by those skilled in the art, in some embodiments of the present invention, presence server 103 might store a calendar with information concerning one or more users (e.g., user 101-2, etc), while in some other embodiments of the present invention, presence server 103 might store a plurality of calendars, each associated with a respective user, while in still some other embodiments, presence server 103 might instead obtain calendar information by transmitting a request to another entity (e.g., telecommunications terminal 102-2; another element of telecommunications system 100 not depicted in FIG. 1, such as a Microsoft Exchange® server; etc.). As will further be appreciated by those skilled in the art, in some other embodiments of the present invention presence server 103 might also transmit an interrupt request to user 101-2 and determine whether to grant the communication request at task 240 based on user 101-2's response to the interrupt request. In any case, it will be clear to those skilled in the art, after reading this disclosure, how to make and use embodiments of the present invention that are capable of performing task 240.

At task 250, presence server 103 transmits a response to terminal 102-1 indicating whether or not the communication request has been granted, in well-known fashion. After task 250, the method of FIG. 2 terminates.

As will be appreciated by those skilled in the art, in some other embodiments of the present invention, one or more tasks of the method of FIG. 2 might be performed by a different entity than that of the illustrative embodiment, and it will be clear to those skilled in the art, after reading this disclosure, how to make and use such embodiments of the present invention. For example, in some other embodiments of the present invention, task 240 might be performed by telecommunications terminal 102-1 (in which case, tasks 220, 230, and 250 might be unnecessary), or by some other element of telecommunications system 100 not depicted in FIG. 1, instead of by presence server 103.

Figure 3:
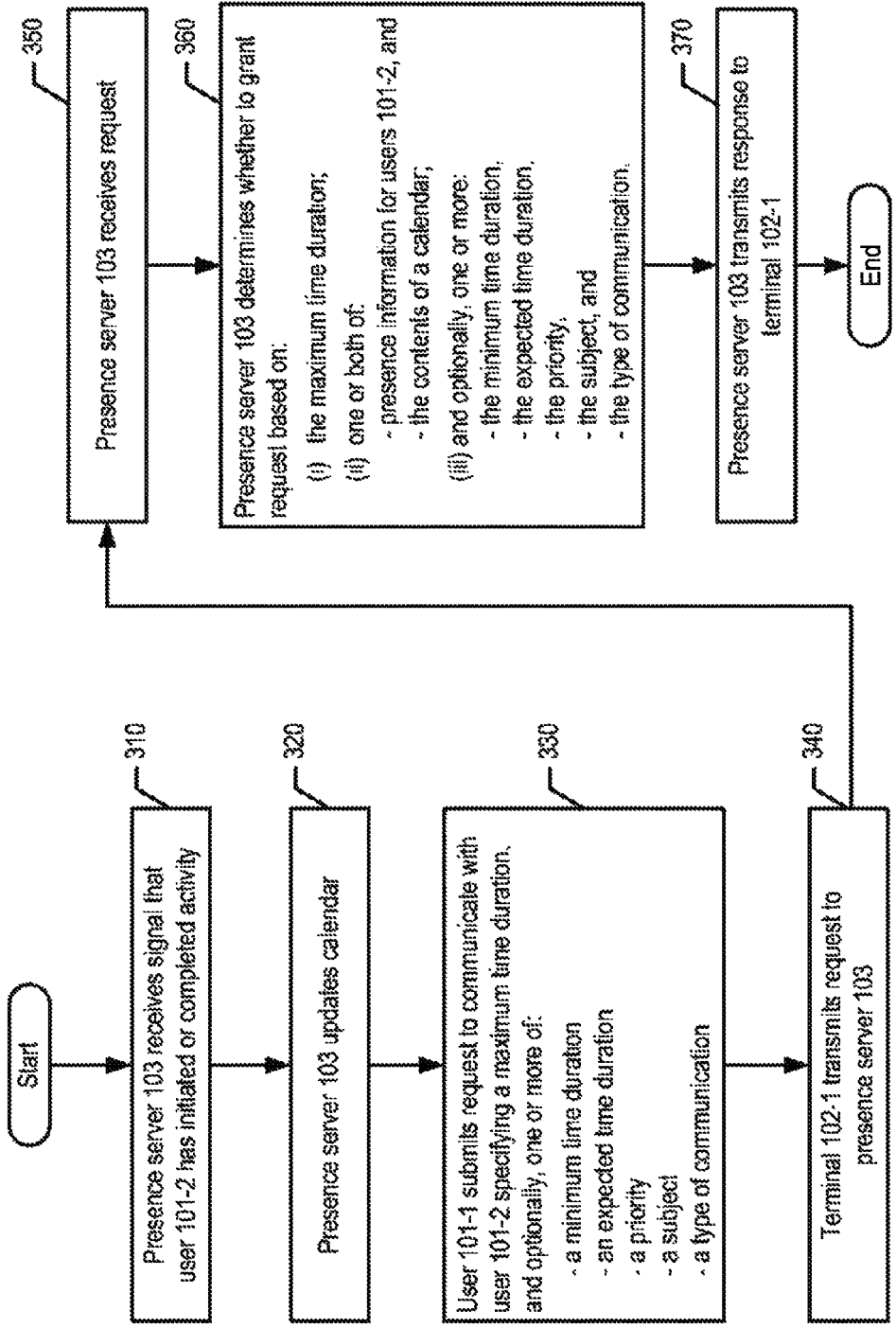
FIG. 3 depicts a flowchart of a second method for allowing or refusing communication requests, in accordance with the illustrative embodiment of the present invention.

FIG. 3 depicts a flowchart of a second method for allowing or refusing communication requests, in accordance with the illustrative embodiment of the present invention. It will be clear to those skilled in the art, after reading this disclosure, which tasks depicted in FIG. 3 can be performed simultaneously or in a different order than that depicted.

At task 310, presence server 103 receives a signal that indicates that user 101-2 has initiated or completed an activity involving telecommunications terminal 102-1 (e.g., user 101-2 launches or terminates an application that executes on the user's telecommunications terminal, user 101-2 initiates or terminates a communications session, user 101-2 opens or closes a file, etc.). In accordance with the illustrative embodiment, telecommunications terminal 102-1 is programmed to transmit the signal to presence server 103 when such activity initiation or completion occurs. As will be appreciated by those skilled in the art, however, in some other embodiments of the present invention the detection of such events, and/or the transmission of the signal, might be performed by some other entity of telecommunications system 100 instead of terminal 102-1 (e.g., an applications server not depicted in FIG. 1, etc.), and it will be clear to those skilled in the art, after reading this disclosure, how to make and use such embodiments of the present invention.

At task 320, presence server 103 updates the contents of a calendar accordingly in response to the received signal. For example, if the received signal indicates that user 101-2 has initiated a web-conferencing application at 12:25 pm, and a calendar comprises an entry for a videoconference lasting from 12:30 pm to 1:30 pm, the calendar entry is modified to indicate that the videoconference starts at 12:25 pm. Similarly, if the received signal indicates that user 101-2 has terminated a videoconference communication session at 1:20 pm, the calendar entry is modified so that the ending time of the videoconference is 1:20 pm.

At task 330, user 101-1 submits a request via telecommunications terminal 102-1 to communicate with user 101-2, where the request specifies a maximum time duration, and optionally, one or more of:
 a minimum time duration,
 an expected time duration,
 a priority,
 a subject, and
 a type of communication (e.g., voice call, email, short message service [SMS] message, etc.).

At task 340, telecommunications terminal 102-1 transmits the request to presence server 103 via telecommunications network 105, in well-known fashion.

At task 350, the request is received by presence server 103, in well-known fashion.

At task 360, presence server 103 determines whether to grant the communication request based on:
 the maximum time duration;
 one or both of:
  presence information for user 101-2, and
  the updated contents of the calendar;
 and optionally, one or more of:
  the minimum time duration,
  the expected time duration,
  the priority,
  the subject, and
  the type of communication.

As will be appreciated by those skilled in the art, as in the case of the method of FIG. 2, in some embodiments of the present invention, presence server 103 might store a calendar with information concerning one or more users (e.g., user 101-2, etc), while in some other embodiments of the present invention, presence server 103 might store a plurality of calendars, each associated with a respective user, while in still some other embodiments, presence server 103 might instead obtain calendar information by transmitting a request to another entity (e.g., telecommunications terminal 102-2; another element of telecommunications system 100 not depicted in FIG. 1, such as a Microsoft Exchange® server; etc.). As will further be appreciated by those skilled in the art, in some other embodiments of the present invention presence server 103 might also transmit an interrupt request to user 101-2 and determine whether to grant the communication request at task 340 based on user 101-2's response to the interrupt request. In any case, it will be clear to those skilled in the art, after reading this disclosure, how to make and use embodiments of the present invention that are capable of performing task 360.

At task 370, presence server 103 transmits a response to terminal 102-1 indicating whether or not the communication request has been granted, in well-known fashion. After task 370, the method of FIG. 3 terminates.

As will be appreciated by those skilled in the art, in some other embodiments of the present invention, one or more tasks of the method of FIG. 3 might be performed by a different entity than that of the illustrative embodiment, and it will be clear to those skilled in the art, after reading this disclosure, how to make and use such embodiments of the present invention. For example, in some other embodiments of the present invention, task 360 might be performed by telecommunications terminal 102-1 (in which case, tasks 340, 350, and 370 be unnecessary), or by some other element of telecommunications system 100 not depicted in FIG. 1, instead of by presence server 103.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
 receiving, by a processor, a request from a first user to establish a second communication session with a second user, wherein said request specifies a maximum time duration of said second communication session; and
 determining whether to grant said request based on said maximum time duration and on presence information for said second user, wherein the determination whether to grant said request is also based on a calendar entry of a first communication session that includes a first end time of said first communication session, wherein said first end time of said calendar entry of said first communication session is modified to a second end time based on said second user terminating said first communication session before said first end time of said first communication session, and wherein said second request is granted based on said modified second end time.

2. The method of claim 1, wherein said contents of said calendar are updated based on said second user opening or closing a file.

3. The method of claim 1 wherein said request also specifies a minimum time duration, and wherein the determination whether to grant said request is also based on said minimum time duration.

4. The method of claim 1 wherein said request also specifies an expected time duration, and wherein the determination whether to grant said request is also based on said expected time duration.

5. The method of claim 1 wherein said request also specifies a type of said second communication session, and wherein the determination whether to grant said request is also based on said type of said second communication session.

6. The method of claim 1, wherein the calendar entry also includes a first start time of said first communication session, wherein said first start time of said calendar entry of said first communication session is modified to a second start time based on said second user launching a second application after said first start time of said communication session, and wherein a second request is granted based said modified second start time.

7. The method of claim 1, wherein said request also specifies a priority, and wherein the determination whether to grant said request is also based on said priority.

8. The method of claim 1, wherein said request also specifies a subject, and wherein the determination whether to grant said request is also based on said subject.

9. A method comprising:
 receiving, by a processor, a signal that indicates that a second user has completed a first communication session involving a telecommunications terminal;
 updating an entry of a calendar in response to said signal, wherein a first end time of said first communication session in said calendar entry is modified to a second end time based on said second user completing said first communication session before said first end time of said first communication session;

receiving a request from a first user to establish a second communication session with said second user, wherein said request specifies a maximum time duration of said second communication session; and determining whether to grant said request based on said maximum time duration and on the updated entry of said calendar.

10. The method of claim 9 wherein said signal also indicates that said second user has terminated an application.

11. The method of claim 9 wherein said request also specifies a priority, and wherein the determination whether to grant said request is also based on said priority.

12. The method of claim 9, wherein the calendar entry also includes a first start time of said first communication session, wherein said first start time of said calendar entry of said first communication session is modified to a second start time based on said second user launching a second application after said first start time of said communication session, and wherein a second request is granted based said modified second start time.

13. The method of claim 9, wherein said request also specifies a subject, and wherein the determination whether to grant said request is also based on said subject.

14. A method comprising:

receiving, by a processor, a request from a first user to establish a second communication session with a second user, wherein said request specifies a maximum time duration of said current communication session; and determining whether to grant said request based on said maximum time duration, wherein the determination whether to grant said request is also based on a calendar entry of a first communication session that includes a first end time of said first communication session, wherein said first end time of said calendar entry of said first communication session is modified to a second end time based on said second user completing said first communication session before said first end time of said first communication session, and wherein said second request is granted based said modified second end time.

15. The method of claim 14 wherein said request also specifies a priority, and wherein the determination whether to grant said request is also based on said priority.

16. The method of claim 14 wherein said request also specifies a subject, and wherein the determination whether to grant said request is also based on said subject.

17. The method of claim 14 wherein said request also specifies a minimum time duration, and wherein the determination whether to grant said request is also based on said minimum time duration.

18. The method of claim 14 wherein said request also specifies an expected time duration, and wherein the determination whether to grant said request is also based on said expected time duration.

19. The method of claim 14 wherein said request also specifies a type of current communication session, and wherein the determination whether to grant said request is also based on said type of current communication session.

20. The method of claim 14, wherein the calendar entry also includes a first start time of said first communication session, wherein said first start time of said calendar entry of said first communication session is modified to a second start time based on said second user launching a second application after said first start time of said communication session, and wherein a second request is granted based said modified second start time.

* * * * *